No. 868,678. PATENTED OCT. 22, 1907.
P. MacA. MacKASKIE.
ROTARY ENGINE.
APPLICATION FILED FEB. 14, 1906.
6 SHEETS—SHEET 3.
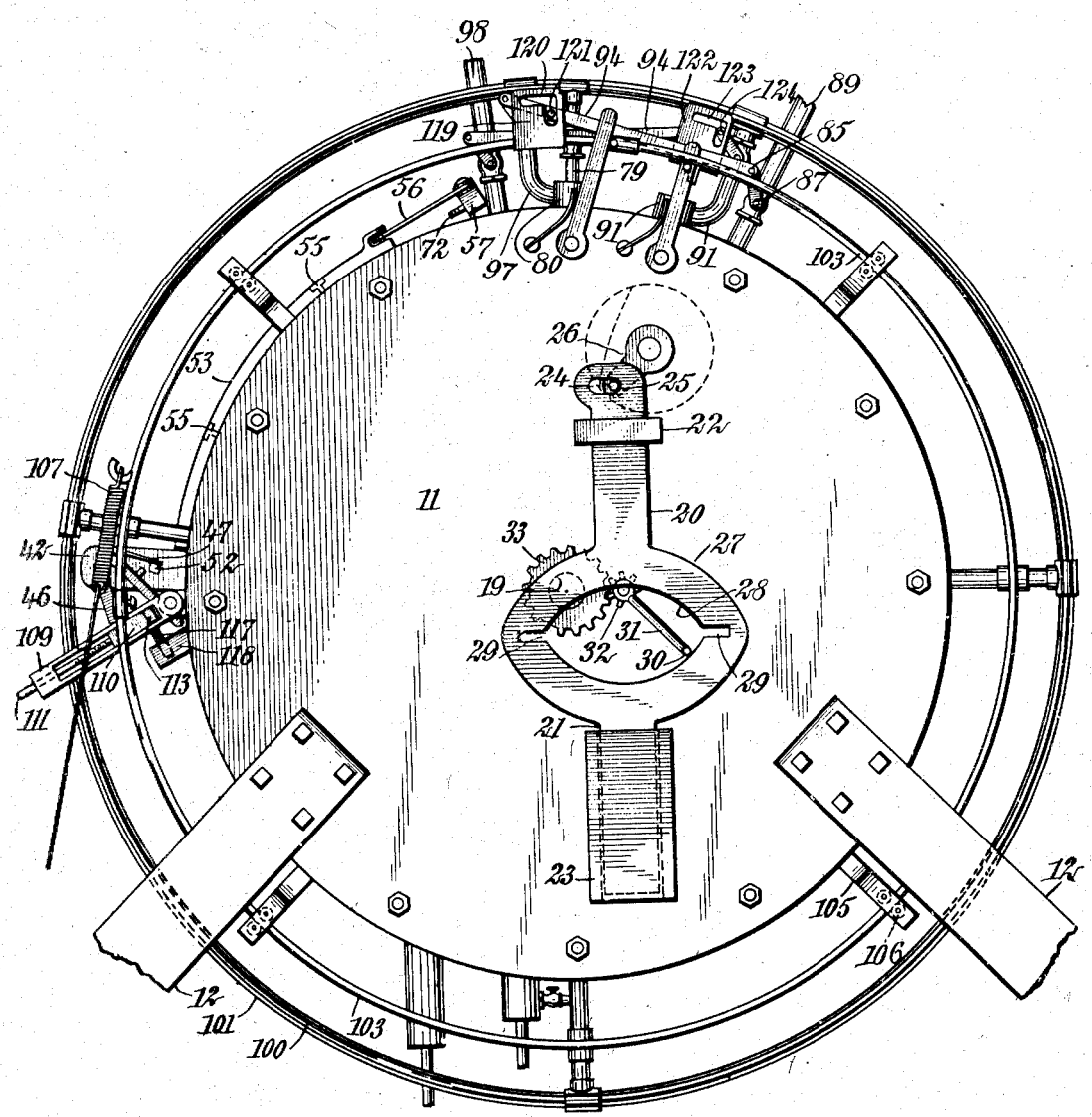

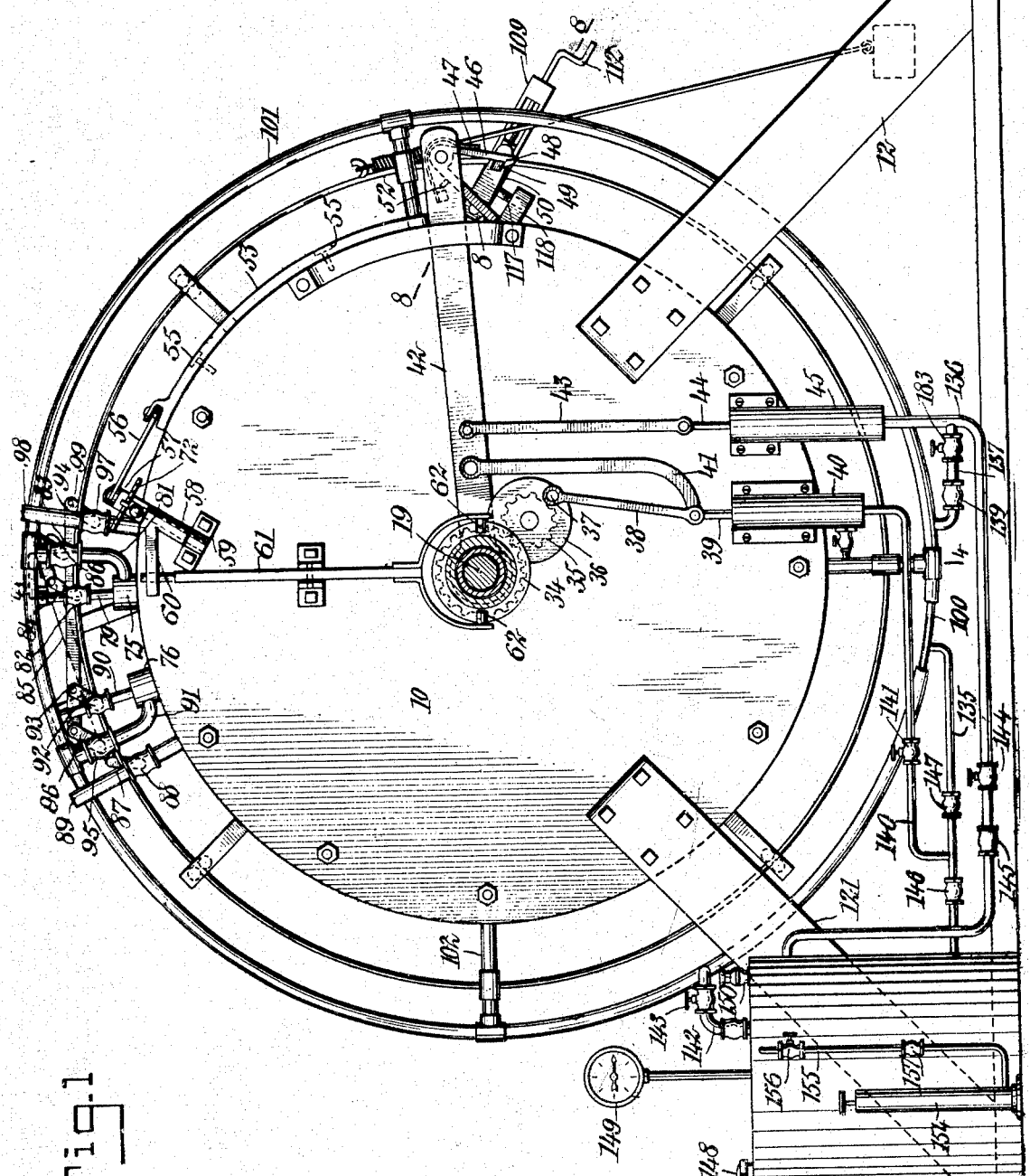

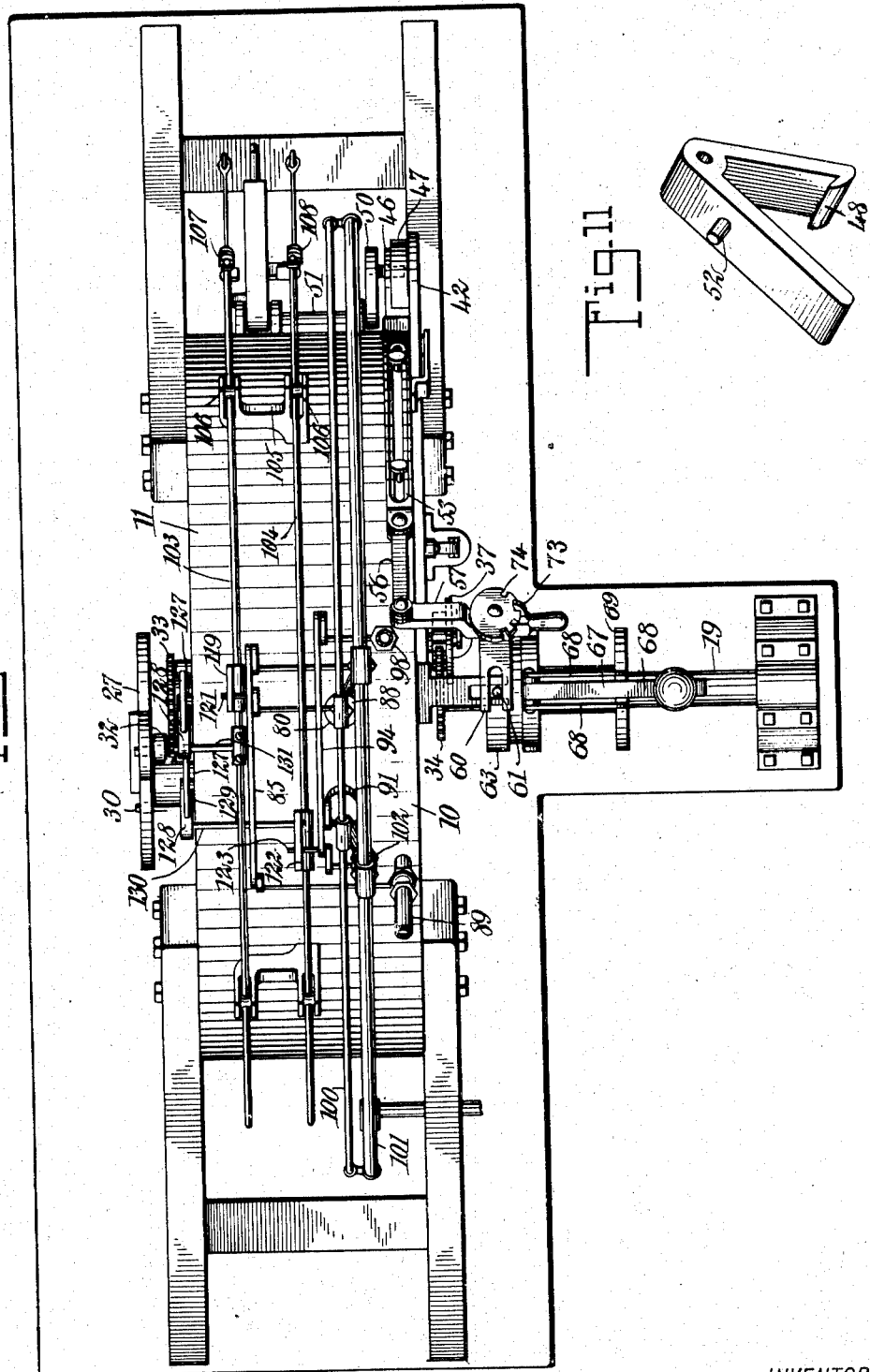

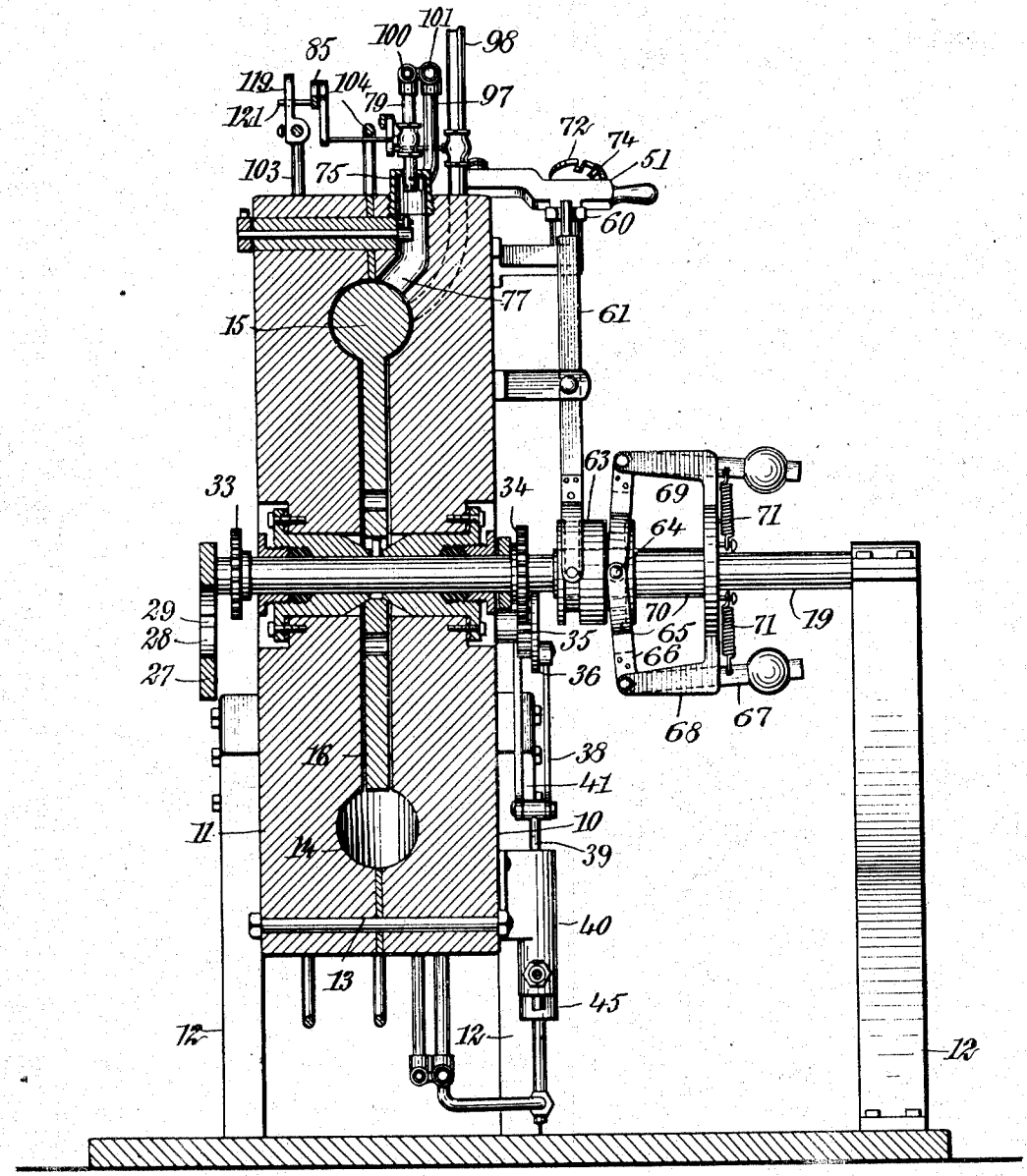

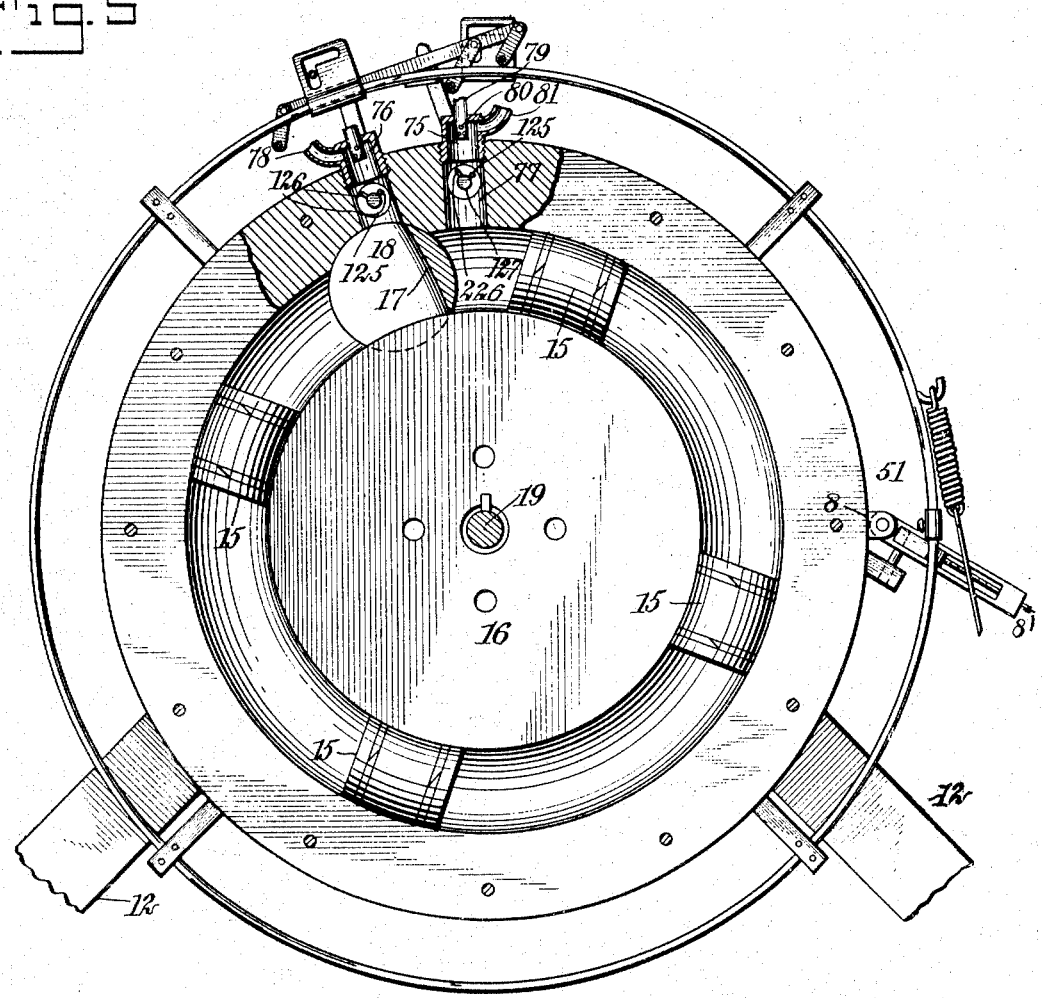

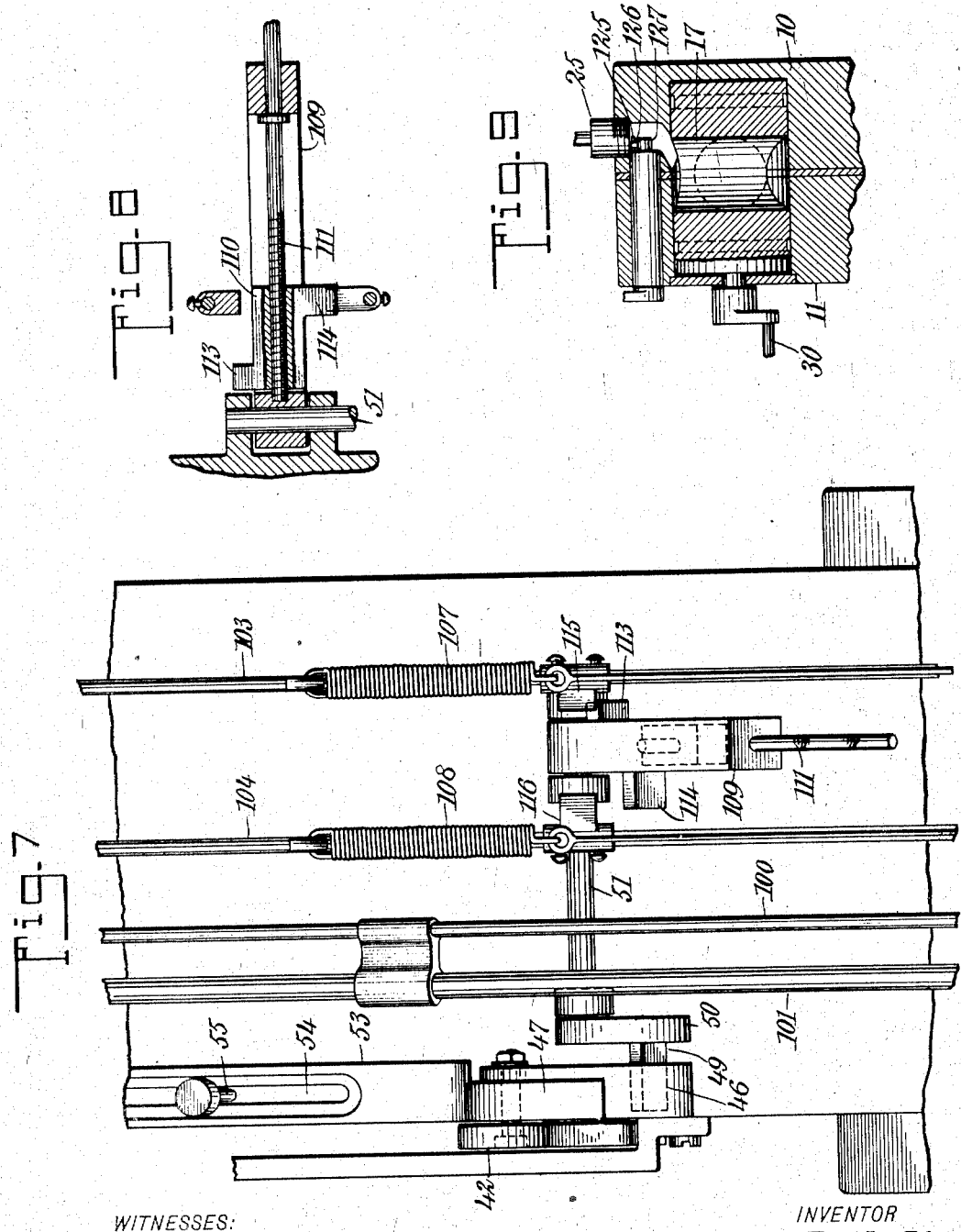

UNITED STATES PATENT OFFICE.

PETER MacALLISTER MacKASKIE, OF GOLDFIELD, NEVADA.

ROTARY ENGINE.

No. 868,678.     Specification of Letters Patent.     Patented Oct. 22, 1907.

Application filed February 14, 1906. Serial No. 300,997.

*To all whom it may concern:*

Be it known that I, PETER MACALLISTER MACKASKIE, a citizen of the United States, and a resident of Goldfield, in the county of Esmeralda and State of Nevada, have invented a new and Improved Rotary Engine, of which the following is a full, clear, and exact description.

This invention relates to improvements in engines or motors of the rotary type, the object being to provide an engine of this character, primarily adapted for the use of mixed gasolene and air as a motive agent, but which, by leaving off certain parts may be actuated by steam.

Another object is to provide in connection with the engine, a supply-tank for gasolene and air which should be thoroughly mixed before entering the combustion chamber.

Other objects of the invention will appear in the general description.

I will describe a rotary engine embodying my invention and then point out the novel features in the appended claims.

Reference is to be had to the accompanying drawings forming a part of this specification, in which similar characters of reference indicate corresponding parts in all the figures.

Figure 1 is a side elevation of a rotary engine embodying my invention; Fig. 2 is a top plan thereof; Fig. 3 is an elevation at the opposite side to that of Fig. 1; Fig. 4 is a sectional elevation on the line 4—4 of Fig. 1; Fig. 5 is an elevation partly in section with one side of the casing or cylinder removed; Fig. 6 is an elevation of the gas or pressure tank; Fig. 7 is a detail showing a governor mechanism employed; Fig. 8 is a section on the line 8—8 of Fig. 1; Fig. 9 is a sectional detail illustrating the abutment employed; Fig. 10 is a detail showing the abutment in operative position; and Fig. 11 is a perspective view of a trip employed.

The casing or cylinder of the engine as here shown, consists of two sections 10, 11, which are bolted together and supported on uprights 12, and a tight connection may be made between the sections 10, 11 of the cylinder by a packing ring 13. Each section, at the inner side, has a circular recess 14 which is transversely concave or made semicircular; when the sections are placed together a circular opening is formed in which the piston blades or blocks 15 move. Inward of the circular opening for the piston blocks the inner sides of the cylinder members 10, 11 are spaced apart so as to receive a disk 16 on which the piston blocks 15 are mounted. I have here shown four piston blocks, but it is to be understood that the number may be varied, without departing from the spirit of my invention.

Rotatably arranged across the opening 14, as here shown, near the top, is an abutment 17 having an opening 18 through it to permit the passing therethrough of the piston blocks when said abutment is turned to bring its opening in line with the opening 14. The disk 16 is mounted rigidly on the driving shaft 19, and from this driving shaft the movements of the abutment are caused. The device for causing the movements consists of an upwardly extended plate 20 and a downwardly extended plate 21, the upper plate being slidable in a guide 22, while the lower plate is slidable in a guide 23. The end of the upper plate 20 is provided with a slot 24 for receiving a pin 25 extended from the crank arm 26 attached to the outer end of the abutment shaft.

Attached to the plates 20 and 21 is a cam or throwing-plate 27, having an elliptical opening 28, the major axis of the elliptical opening being extended horizontally, and at the ends the plate 27 is provided with notches 29 for receiving a pin 30 on an arm 31 attached to a pinion 32 mounted on a stud extended from the casing or cylinder, and this pinion meshes with a gear 33 on the shaft 19. By this construction, while the engine is in motion the arm 31 will be moved in a circular direction, causing its pin 30 to engage first in one of the notches 29 to move the device in one direction and then to engage in the opposite notch 29 to move the device in the opposite direction. While the arm is passing from one notch 29 to the other the shifting device for the abutment will remain stationary, thus holding the abutment in operative position or holding it in position to permit the passing therethrough of the piston blocks. This abutment position is indicated in Fig. 10.

Keyed to the driving shaft 19 is a gear-wheel 34 which meshes with a small pinion 35, the said gear-wheel and pinion of such certain size that the pinion will rotate four times to one rotary movement of the gear-wheel; that is, provided four piston blocks with four inlets are employed.

On the pinion 35 is a disk 36 which is somewhat larger than the pinion and eccentric; arranged on this disk 36 is a pin 37 from which a link 38 extends to pivotal connection with the piston rod 39 operating in a gasolene pump cylinder 40; this connecting rod or link 38 forces the pump piston up and down, and transmits motion to a link 41, the said link 41 being connected to the pivotal connection between the parts 38 and 39; and the upper end of said link 41 is pivotally connected to a long lever 42 mounted to swing on a central bearing surrounding the driving shaft. This lever 42, obviously, by its connections with the disk 27, will swing in the arc of a circle. A rod or link 43 is pivotally connected to said lever and extends downward to pivotal connection with the piston rod 44 of a piston operating in the air pump cylinder 45.

Mounted to swing on the outer end of the lever 42 is a hook or catch 46 having a downwardly-extended portion terminating in a hook end and a horizontally-disposed portion, and the said device is held yieldingly in position by means of a clap-spring 47. The hook end 48 is designed to engage with the under side of a lug 49 on an arm 50 extended upward from a rock-shaft 51. The horizontally-disposed end of the latch-hook is controlled in its movements by a set-screw 52 carried by said horizontally-disposed portion and adapted to engage with the under side of the spring; the inner end of said spring it will be noted in Fig. 1, is secured by means of a block, to the lever 42. When the lever 42 moves upward it obviously carries the swinging hook or latch with it and as the hook engages with the lug 49 on the arm 50, it is obvious that the shaft 51 will be rocked to open and close the valves as will be hereinafter described.

When the lever 42 moves sufficiently upward, the horizontally-disposed member of the latching device will come in contact with a segmental plate 53, causing a rocking motion of the latch to disengage its hook from the lug 49, thus permitting the rock shaft to return through the agency of devices to be hereinafter described.

The segmental plate 53 has a movement circumferentially of the casing or cylinder on the periphery of which it is mounted. The plate is provided with a slot 54 through which screws or bolts 55 pass, into the casing or cylinder periphery. The movements of the plate 53 are caused by a governor operated by the engine; this movement is designed to regulate the length of time the valves are to remain open and closed. The upper end of the plate 53 has a link connection 56 with an arm 57 having axial rotation in a sleeve 58, which, in turn, is mounted to rotate axially on a pin extending upward from a bracket 59.

Extended toward the main shaft and from the sleeve 58 is a forked arm 60, the fork thereof receiving the upper end of the governor-lever 61 having rocking or pivotal connection with one head of the cylinder or casing. The lower end of the governor rod 61 has curved arms provided with inwardly extended pins 62 designed to engage in an annular channel formed in a wheel 63 mounted loosely on the shaft 19; the said wheel 63 is provided with another annular channel for receiving the pins 64 which pivotally connect the adjacent ends of segmental plates 65, having outwardly extended arms 66 which connect with weighted governor arms 67, the said governor arms being mounted to swing on inward projections 68 from a disk or plate 69 rigidly connected to the driving shaft 19.

The channeled wheel 63 is not mounted directly on the shaft, it is mounted loosely on a sleeve 70 which at its outer end is attached to the inner side of the disk or plate 69. This will prevent wear between the shaft and said channeled wheel.

In addition to weights, the governor arms 67 may have spring connections 71 with said plate or disk 69.

The stud or pin on which the sleeve 58 rotates is provided with a graduated disk 72 designed for stopping and regulating the speed of the engine, and on the part 57 is a pin or lug 73 for engaging in either one of a series of notches formed in the periphery of the disk 72, these notches being indicated at 74 in Fig. 4, and also clearly indicated in Fig. 2. By shifting the part 57 so as to bring its spring lug to an opening or notch of the disk, or moving it from one notch to another, the engine may be stopped, thrown to half speed or quarter speed or any desired speed; that is, by swinging movements of the part 74 the segmental plate 53 will be moved up and down to give more or less stroke to the latch lever to control the length of time that the valve shall be open or closed.

Connected to the cylinder are firing chambers or nipples 75, 76, the mixing and firing chamber 75 communicating with the interior of the cylinder through a port 77; while the mixing and firing chamber 76 communicates with the interior of the cylinder through a port 78. One of these chambers is designed for receiving the explosive material for moving the piston in one direction, while the other is designed to receive explosive material for moving the piston in the opposite direction; that is, the mixing and explosive chamber 75 may be deemed the one for receiving the material for the forward movement, while the other is for reverse movement.

Extended through the top of the nipple 75 is a gasolene supply pipe provided with a valve 82 the inner end, which projects into the nipple, being provided with side perforations 80 which will cause a spraying of the gasolene to thoroughly mix with the air admitted through the pipe 81; and the air pipe is provided with a valve 83. The stem of the valve 82 has an arm 84, the end of which is pivotally connected to an actuating bar 85, and the stem of the valve 83 is provided with an arm 86 also pivotally connected to said actuating bar 85; the said actuating bar also has a pivotal connection with an arm 87 on the stem of a valve 88 in an exhaust pipe 89; this exhaust pipe being arranged rearward of the mixing and firing chamber or nipple 76.

Leading into the nipple 76 is a gasolene supply pipe or tube 90, similar to the one first described; and also leading therein or into said nipple is an air supply pipe 91. The valve 92 in the pipe 90 has its stem connected pivotally by an arm 93 with an actuating bar 94, and the valve 95 in the air supply pipe 91 has its stem connected by an arm 96 to said actuating bar, and this actuating bar has connection with the valve 97 in the exhaust pipe 98 through the medium of an arm 99. Gasolene is admitted to the gasolene supply pipes 79 and 90 through a main pipe 100, which is of circular form and extends around the casing or cylinder, and the air pipes 81 and 91 have suitable connection with an air supply pipe 101 which is also of circular form and extends around the casing or cylinder. These pipes are suitably supported by posts 102 extended outward from the periphery of the casing or cylinder. The means for supplying gasolene and air to said pipes will be hereinafter described as I shall now point out the means for actuating the valves; this means comprises valve rods 103 and 104 which are in the form of rings which extend around the casing or cylinder and have a movement back and forth circumferentially of said casing or cylinder. The outer rod 103 has actuating connection with the actuating bar 85, while the rod 104 has connection with the bar 94; these rods are supported in brackets 105 on the periphery of the cylinder and in these brackets are rollers 106 with which the rods engage, thus permitting free movement of said rods. The rods are moved respectively in one direction to close the valves controlled by them, by means of springs 107, 108, the said springs at their lower ends having connection with a fixed portion of the engine frame, while the upper ends engage with hook members on the rods.

The means for moving the rods, that is, either one of the rods, in one direction, to open its valves while the other rod remains stationary, comprises an arm 109 which is attached to the shaft 51, and the said arm is longitudinally slotted to receive a reversing block 110 which is moved lengthwise through the slot by means of a screw 111 the thread of which engages in the tappet opening of the block 110, the interior end of said screw rod being provided with a crank-handle 112.

Extended outward from the reversing block 110 and at opposite sides are lugs 113, and 114, and it will be noted that the lugs are spaced apart or one above the other as one lug is designed to impart movement to one of the ring-like piston rods while the other is to impart movement to the other of said ring-like piston rods, one rod of course, being stationary while the other rod operates to admit motive agent for moving the engine in one direction. When the piston rod 103 is in operation the lug 113 is designed to engage with a tappet 115 adjustably connected to said rod 103, while the lug 114 is designed to engage with a tappet 116 adjustably connected to the rod 104. The arm 109 is prevented from moving too far downward, by means of a screw 117 for engaging against the under side of said arm and adjustable in a lug 118 on the periphery of the casing or cylinder.

Connected to the upper portion of the valve rod 103 is a plate 119 having an angular slot 120 into which a pin 121 on the actuated bar 94 passes. The rod 104 carries a similar plate 122 provided with an angular slot 123 for receiving a pin 124 extended from the actuated bar 85. In the operation of this part of my invention, by turning the screw rod 111, the reversing block may be raised or lowered and brought in position for contact, or out of contact with the valve rods as desired.

When the arm 109 is moved upward through the agency of the rock-shaft 51 and which is governed by the mechanism heretofore described, the lug on one side of the reversing block will come in contact with the tappet carried by the circular valve rod at that side, thus moving the valves connected with the said rod to open position and the opening of the valves will be just so much as the governor will permit. In reversing, the other lug on the reversing block is designed to engage with the tappet carried by the piston rod on that side and the other rod will remain idle as the second-named rod actuates its valves. To make this clearer it may be stated that there is space enough or depth enough between the two lugs on the reversing block so that when one side of the reversing block is being thrown out of gear the lug on the other side will not be thrown into gear until the other is positively out of gear. This protection is necessary so that the forward and backward valves will not be opened together and at the same time; as before stated, the springs connecting with the rods move them to close the valve.

The angular slots in the plates on the valve rods are designed to permit the opening of the valves to any distance required and when fully open they will be held in such position as long as desired without the necessity of causing the valves to revolve unnecessarily; that is, when the valves are open fully so as to form a straightway passage for the motive agent to enable it to enter the cylinder, the valves will be locked and remain in that position as long as required, because the pin on an actuated bar will pass into the vertically-disposed portion of the slot in its angular plate, where it will remain until released by the return movement of the valve rod.

Arranged in each firing chamber or in the port leading therefrom into the cylinder, is an electric sparking device consisting of a fixed point 125 co-acting with which are points 126 mounted on rotary shafts 127 each having an upwardly extended arm 128. The circular valve rods 104 and 103 will break the contact, and springs 129 will make the contact by moving the arms 128. When the circular valve rods move forward to open the valves, the spring 129 will move the arms 128 and put the sparking hammer in contact and will remain in contact while the valves are open. When the valve rods 103, 104 have closed the valves, or about closed them, they will then break the contact by means of the pins 130 and 131. The pins extended from said rods for actuating the sparking devices will preferably be connected to the rods by means of sleeves adjustable on the rods so that the sparking may be caused to take place at the proper time.

I will now describe the means for supplying current and air. This comprises a tank 132 having a chamber 133 in its lower portion for gasolene, and a chamber 134 in its upper portion for containing air. These chambers have pipe connections with the pumps 40 and 45 and also with the supply pipes for gasolene and air. That is, from the lower portion of the gasolene chamber a pipe 135 leads into the gasolene supply pipe 100 and a pipe 136 leads from the pump 45 to the upper portion of the air chamber, and the said pipe 136 has a branch connection 137 with the air pipe 101, and this branch is provided with a hand valve 138 and a check valve 139. The pipe 135 has a branch connection 140 with the pump cylinder 40, and this pipe 140 is provided with a hand valve 141. From the upper portion of the air chamber 134 a branch pipe 142 leads to the pipe 101 and in this branch 142 is a hand valve 143; between the valve 144 in the pipe 136 and the tank is a check valve 145 which will prevent back pressure, and a similar check valve 146 is placed between the pipe 140 and the tank, and at the opposite side of the pipe 140 is another check valve 147. The tank is provided with a safety valve 148 and with a pressure gage 149, and the tank is also provided with a filling tube 150 which leads through the separating partition 151 into the gasolene chamber; this filling tube being provided with a suitable valve 152.

Extended through the partition 151 is a trap pipe 153 which will prevent any moisture or condensation in the chamber 134 passing into the gasolene chamber. The trap pipe will also prevent any condensation of the gasolene from passing out of the gasolene tank into the chamber 134. If desired, the air chamber may communicate with a hand pump 154 through a pipe 155 having a hand valve 156 and a check valve 157 which will prevent back pressure when the pump is operated.

After getting the desired amount of pressure in the air pump the valves may be closed in the pipes leading from the pumps actuated by the engine. When the engine has been stopped for any length of time, the air pump may be used and the tank charged by hand and the engine started instantly. I claim by the use of this pressure tank the air and gasolene will equalize themselves, giving the same amount of pressure on the air as there will be on the gasolene, and it will adjust itself and maintain a correct balance, and by using right proportion inlets to the cylinder a good explosion in a cylinder will be assured.

Having thus described my invention, I claim as new and desire to secure by Letters Patent:—

1. A rotary engine comprising a cylinder, a piston operating therein, a valve for controlling the inlet of motive agent, a valve for controlling the exhaust, a ring-like valve rod arranged to have a rotary movement circumferentially of the cylinder, and means actuated by the engine for moving the said rod in one direction.

2. A rotary engine comprising a cylinder, a piston operating therein, a valve for controlling inlet of motive agent to the cylinder, a valve for controlling exhaust, a ring-like valve rod having connection with said valves, the said valve rod having a rotary movement circumferentially of the cylinder, means actuated by the engine for causing the movement of said rod in one direction, and means for adjusting the degree of such movement.

3. An engine comprising a cylinder, a piston for operating therein, a nipple forming a combustion chamber and having communication with the cylinder, a gasolene supply pipe leading into said nipple, an air supply pipe leading into said nipple, an exhaust pipe, admission-controlling valves, an exhaust-controlling valve, means actuated by the engine for moving said rod in one direction, a spring for moving the rod in the opposite direction, and a sparking device for igniting the motive agent.

4. A rotary engine comprising a cylinder having a circular or ring-like piston chamber, piston blocks movable in said chamber, a disk to which said blocks are attached, an abutment device mounted to rotate in said chamber, and having an opening through which said blocks may pass, valve-controlled gasolene inlet pipes at opposite sides of the abutment, valve-controlled air supply pipes at opposite sides of the abutment, the said pipes communicating with said chamber, valve-controlled exhaust pipes at opposite sides of the abutment, a ring-like piston rod for engaging with the valves of the gasolene and air pipes, at one side of the abutment, and also for actuating the valve of the exhaust pipe at the opposite side of the abutment, a ring-like piston rod for operating the valves in the other gasolene and air pipes, and also operating to control the valve at the opposite side of the abutment from that of the last-named gasolene and air-pipes, and means actuated by the engine for operating either one of said rods while the other rod remains idle.

5. A rotary engine comprising a cylinder, a piston for operating therein, an abutment in the cylinder mounted to rotate to permit movement of the piston therethrough, firing or combustion chambers at opposite sides of the abutment, gasolene supply pipes leading into said chambers, air supply pipes leading into said chambers, the said supply pipes being extended around the cylinder, valves for controlling the discharge of motive agent from said pipes, exhaust pipes at opposite sides of the abutment, valves in said exhaust pipes, a ring-like rod for operating the valves in one pair of supply pipes, and for controlling the valve in the exhaust pipe at the opposite side of the abutment, a ring-like rod for controlling the valves of the supply pipes at said opposite side of the abutment and controlling the valve in the exhaust at the first-named side, the said ring-like rods being operated in one direction by movements of the engine springs for moving the same in the opposite direction, and means for regulating the movements of said rods.

6. A rotary engine comprising a cylinder, a piston for operating therein, a rotary abutment in the cylinder having an opening through which the piston may pass, means actuated from the engine-shaft for imparting rotary or rocking motion to said abutment, firing or combustion chambers communicating with the interior of the cylinder at opposite sides of the abutment, gasolene and air pipes having communication with said firing or combustion chambers, valves in said communications, exhaust pipes at opposite sides of the abutment and having valves, ring-like valve rods, and means for operating the same for automatically closing the supply pipes at one side of the abutment and opening the valve of the exhaust at the opposite side of the abutment.

7. A rotary engine comprising a cylinder, a piston mounted to rotate therein, a rotary abutment extended into the cylinder and having an opening through which the piston may pass, combustion chambers at opposite sides of the abutment, means for conducting gasolene and air to the chambers at opposite sides of the abutment, means for automatically controlling the entrance of the motive agent to the combustion chambers, a driving-shaft extended through the piston, a gear-wheel on an outer end of said shaft, a pinion with which said gear wheel meshes, an arm carried by said pinion, a sliding plate having a cam with which said arm engages, a crank on the shaft of the abutment, and a connection between said crank and said sliding plate.

8. A rotary engine comprising a cylinder, a piston mounted to rotate therein, a rotary abutment in the cylinder and having an opening through which the piston may pass, a crank on the outer end of the abutment-shaft, a sliding plate having engagement at its upper end with said crank, a cam-plate carried by said sliding plate and having an elliptical inner wall, the major axis of which extends transversely of the engine, the ends of said elliptical wall being provided with slots, a gear-wheel on the engine-shaft, a pinion engaged by said gear-wheel, an arm carried by the pinion, a finger on said arm for engaging alternately in said slots, and means for directing the motive agent to the interior of the cylinder at opposite sides of the abutment.

9. A rotary engine comprising a cylinder consisting of two sections secured together, each of said sections having a circular recess in its inner surface, the said recess being semi-circular in cross section, whereby a circular chamber is formed when the two parts of the cylinder are secured together, the said sections being spaced apart inward of said chamber, a shaft, a disk attached to said shaft in said spaced portion, piston blocks mounted on said disk and movable in said chamber, a rotary abutment having an opening through which said blocks may pass when the abutment is in one position, a sliding plate provided with a cam, means actuated from the shaft for engaging said cam to move the sliding plate, a connection between the sliding plate and the abutment for moving the latter, means for admitting motive agent to said chamber at opposite sides of the abutment, and exhaust pipes at opposite sides of the chamber.

10. A rotary engine comprising a cylinder, a driving shaft mounted to rotate therein, a piston mounted on said shaft, a rotary abutment in the cylinder and having an opening through which the piston may pass, a crank arm on the outer end of the abutment shaft, means controlled from the driving shaft and connected with said crank arm for moving said abutment, firing chambers communicating with the interior of the cylinder at opposite sides of the abutment, a pipe for directing gasolene to the firing chambers, a pipe for conducting air to said chambers, means for controlling the entrance of motive agent to the said chambers, and means for forcing air and gasolene to the chambers under substantially equal pressure.

11. In a rotary engine comprising a cylinder, a driving shaft mounted to rotate therein, a piston mounted on said shaft and comprising piston blocks, a rotary abutment in the cylinder and having an opening through which said blocks may pass, a crank arm on the outer end of the abutment shaft, means controlled from the driving shaft and connected with said crank arm for moving said abutment, firing or combustion chambers communicating with the cylinder at opposite sides of the abutment, air supply pipes communicating with such chambers, gasolene pipes extended into the chambers and having discharge perforations at the side, exhaust pipes at opposite sides of the abutment, valves in said exhaust pipes, means actuated by the engine for opening the supply controlling-valves at one side of the abutment, and closing the valve in the exhaust at the opposite side of the abutment, means for controlling the entrance of motive agent at the said opposite side of the abutment, the said means also actuating the valve in the exhaust pipe at the first-mentioned side of the abutment, and automatically-actuated sparking devices leading into the combustion chambers.

12. A rotary engine comprising a cylinder, a piston mounted to rotate therein, a rotary abutment in the cylinder, means for operating the admission of motive agent to the cylinder, at opposite sides of the abutment, means for controlling said admission at one side of the abutment, means for controlling the admission of motive agent at the opposite side of the abutment, the said controlling means comprising ring-like valve rods, a rock-shaft device for actuating the rock-shaft from the engine-shaft, an arm and devices carried by the arm for actuating either one of said controlling devices while the other remains stationary.

13. A rotary engine comprising a cylinder, a piston mounted to rotate therein, an abutment in the cylinder, firing chambers communicating with the cylinder at opposite sides of the abutment, gasolene supply pipes leading into said chambers, valves in said pipes, exhaust pipes at opposite sides of the abutment, valves in said exhaust pipes, a rod having connection with the valve stems of the gasolene and air pipes at one side of the abutment, and having connection with the exhaust valve at the opposite side of the abutment, a ring-shaped rod having connection with the said bar, the said rod having a rotative movement, a gasolene supply pipe leading into the chamber at the opposite side of the abutment, an air supply pipe leading into said chamber, valves in said last-named pipes, an exhaust pipe at the opposite side of the abutment from said last-named pipes, an actuating bar having connection with the valves in said last-named pipes and with the valve in said last-named exhaust pipe, a ring-like valve rod having connection with the stems of said last-named valves, a rock-shaft, means actuated from the engine-shaft to impart movement to said rock-shaft, an arm carried by the rock-shaft and longitudinally slotted, a reversing block movable in said slot, lugs extended upward from said block in opposite directions, and from opposite ends, a screw rod for adjusting the block and tappets on said ring-like valve rods, the top of one of said valve rods being arranged for engagement with one of said lugs, and a tappet on the other rod adapted for engagement with the other of said lugs.

14. A rotary engine comprising a cylinder, a piston mounted to rotate therein, an abutment mounted to rotate in the cylinder and having an opening through which the piston may pass, valve controlled inlets for a motive agent leading into the cylinder, valve controlled exhausts, a ring-like rod having a rotative motion and adapted to actuate the inlet valves at one side of the abutment, and the exhaust valve at the opposite side of the abutment, a ring-like rod for operating the valves controlling the admission of motive agent at said opposite side of the abutment and controlling the exhaust at the first-named side, springs for moving the said rods in one direction, a rock-shaft, an arm carried by said rock-shaft, means carried by the arm for moving one of said rods to open the inlet-controlling valves at one side of the abutment and controlling the exhaust-valve at the opposite side of the abutment, the said arm also having means for actuating the other of said ring-like valves to control the valves connecting therewith, and a governor actuated by the engine for controlling the degree of movement of said rock-shaft.

15. A rotary engine comprising a cylinder, a piston mounted to rotate therein, a gasolene inlet for the cylinder, an air inlet for the cylinder, an exhaust pipe, a valve in each of said pipes, a ring-shaped valve rod having connection with the stems of several valves, a rock-shaft for imparting motion to said rod in one direction, a spring for moving the rod in the opposite direction, an arm extended from the rock-shaft, a lug thereon, a spring-pressed latch for engaging the said lug, a lever actuated by the engine, and to which said latch is pivoted, and an adjustable stop-plate for releasing the latch from said lug.

16. A rotary engine comprising a cylinder, an abutment in the cylinder, valve-controlled gasolene inlet pipes at one side of the abutment, valve-controlled air inlet pipes at said side of the abutment, valve-controlled gasolene and air pipes at the opposite side of the abutment, a circular rod for controlling the first-named valves, a circular rod for controlling the second-named valves, a rock shaft carrying means for actuating either one of said rods in a circumferential direction, a rocking or latching device for the rock shaft, a swinging lever carrying said locking or latching device, a gasolene pump having its piston operated from the shaft, the said piston having connection with said lever, an air pump, the piston of which is operated by movements of said lever, a gasolene and air-pressure tank in which said pumps have pipe connection, a ring-shaped gasolene pipe surrounding the cylinder, and a ring-shaped air pipe surrounding the cylinder and having valve-controlled communication with the pipe leading from the air pump to the pressure tank.

17. A rotary engine comprising a cylinder, valve-controlled gasolene inlet pipes for the cylinder, valve-controlled air inlet pipes for the cylinder, a ring-shaped rod for controlling the valves in one pair of gasolene and air pipes, a ring-shaped rod for controlling the valves in the other pair of pipes, a rock-shaft, a pipe carried by the rock-shaft, for moving either one of said rods while the other remains stationary, an arm extended from one end of the rock-shaft, a lug on said arm, a spring-pressed latching device having a hook portion for engaging the said lug, an abutment-plate for releasing said latch from said lug, a rotary sleeve with which said abutment-plate connects, an arm extended from said sleeve, a governor rod engaging with said arm, and a governor on the engine shaft for moving the said arm.

18. A rotary engine comprising a cylinder, valve-controlled pipes for conducting gasolene into the cylinder, valve-controlled pipes for conducting air into the cylinder, a circular main supply pipe for the gasolene pipes leading into the cylinder, a circular main supply pipe communicating with the air pipes leading into the cylinder, a pressure tank having a chamber at its upper portion for containing air, and a gasolene chamber in its lower portion, a branch pipe leading from the gasolene chamber into the main circular supply pipe, a pump actuated by the engine and having a valve-controlled pipe leading therefrom to connection with said branch pipe, the said branch pipe being provided at opposite sides of said connection with check valves, an air pump, a pipe leading therefrom into the air chamber, the said pipe having a hand-valve and a check valve, a branch leading from said pipe into the circular air pipe, a valve in said branch, and a valve-controlled pipe leading from said air chamber into said circular air pipe.

In testimony whereof I have signed my name to this specification in the presence of two subscribing witnesses.

PETER MacALLISTER MacKASKIE.

Witnesses:
PETER BRECHEISEN,
J. F. WALKER.